United States Patent [19]

Itagaki et al.

[11] Patent Number: 4,495,250

[45] Date of Patent: Jan. 22, 1985

[54] ANION EXCHANGE RESIN OF SURFACE FUNCTIONAL TYPE AND THE PROCESS FOR PRODUCING THE SAME

[75] Inventors: Takaharu Itagaki, Yokohama; Hidenaga Ouchi, Komae; Akihiro Shimura, Yokohama, all of Japan

[73] Assignee: Mitsubishi Chemical Industries Limited, Tokyo, Japan

[21] Appl. No.: 523,593

[22] Filed: Aug. 16, 1983

[30] Foreign Application Priority Data

Aug. 27, 1982 [JP] Japan ................................. 57-148697

[51] Int. Cl.$^3$ ........................ B32B 27/08; B32B 5/16
[52] U.S. Cl. .................................... 428/520; 427/222; 428/407
[58] Field of Search .................. 55/386; 210/198.2; 427/222; 428/402, 407, 515, 520, 315.5, 315.7, 428/315.9, 317.9

[56] References Cited

U.S. PATENT DOCUMENTS

| | | | |
|---|---|---|---|
| 4,101,460 | 7/1978 | Small et al. | 521/32 |
| 4,346,142 | 8/1982 | Lazear | 428/315.7 |
| 4,360,434 | 11/1982 | Kawaguchi et al. | 428/315.5 |
| 4,375,532 | 3/1983 | Baer | 428/407 |
| 4,376,047 | 3/1983 | Pohl | 428/402 |
| 4,386,133 | 5/1983 | Blommers et al. | 428/407 |
| 4,414,111 | 11/1983 | Iwaisako et al. | 428/317.9 |

*Primary Examiner*—William J. Van Balen
*Attorney, Agent, or Firm*—Oblon, Fisher, Spivak, McClelland & Maier

[57] ABSTRACT

A present invention relates to an anion exchange resin of surface functional type and the process for producing the same. The anion exchange resin of the present invention has anion exchange groups only in a linear polymer layer coated on the surface of a lipophilic crosslinked polymer matrix, and ion exchange reaction of the present anion exchange resin proceeds rapidly. Accordingly, the anion exchange resin of the present invention is useful for a packing for ion exchange chromatography.

22 Claims, 2 Drawing Figures

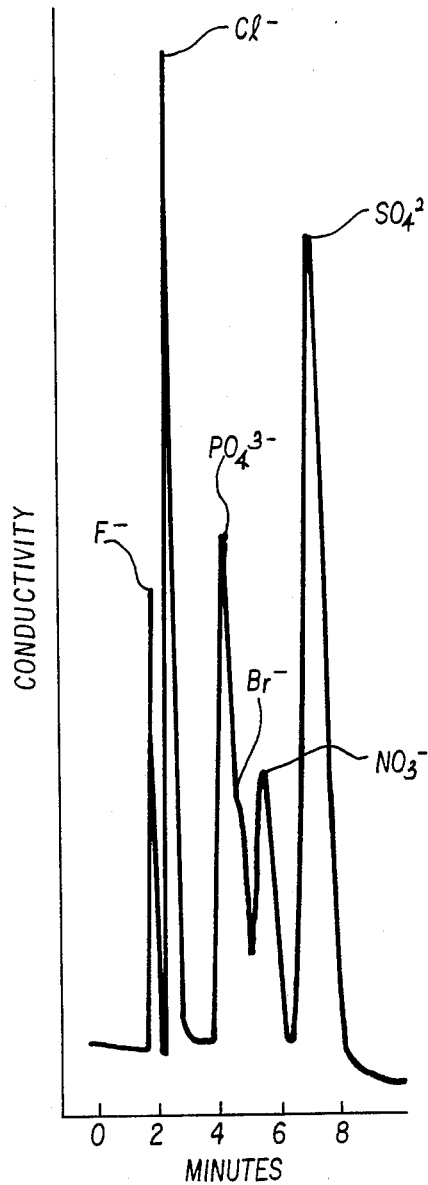
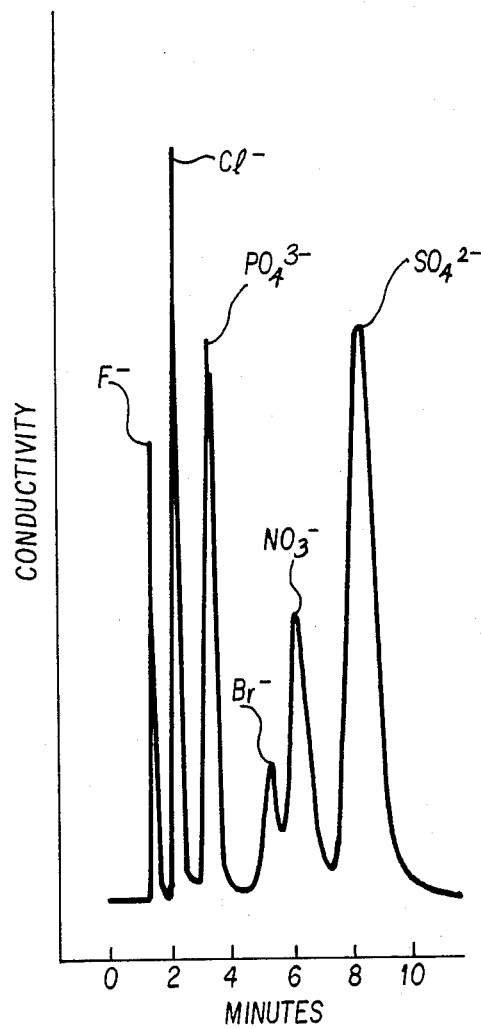
FIG. 1
FIG. 2

4,495,250

ANION EXCHANGE RESIN OF SURFACE FUNCTIONAL TYPE AND THE PROCESS FOR PRODUCING THE SAME

BACKGROUND OF THE INVENTION

The present invention relates to an anion exchange resin of surface functional type and the process for producing the same.

More particularly, the present invention relates to an anion exchange resin of surface functional type which is used for anion exchange chromatography and the process for producing the same.

Recently, ion exchange chromatography is used widely. For example, environmental analyses of atmosphere and water of rivers or lakes; analyses of ions in blow down water of boiler; maintenance and control of industrial plants such as watch of balance of ion concentration in a plating bath; impurity check of medicinal drugs; and analyses of food additives.

The reason why ion exchange chromatography has been used widely is that inorganic ions can be analyzed rapidly and easily with the use of a conductivity detector.

In order to use a conductivity detector, it is necessary to lower conductance of eluent. That means concentration of eluent is obliged to be low.

In order to separate ions rapidly with low concentration eluent, a packing is required to be a surface functional type.

To satisfy such demands, there have been reported so far the following several production methods of a low capacity anion exchange resin used for anion exchange chromatography, but each has its merits and demerits.

One is a method in which a fine anion exchange resin which diameter is not more than 1 $\mu$m is affixed to the surface of a crosslinked polystyrene or the surface sulfonated crosslinked polystyrene which diameter is about 10 $\mu$m. Such agglomerated anion exchange resin, however, has trouble in its life time. It also seems difficult to get smaller particles.

Another method is one in which ion exchange group is introduced to a surface of porous silica gel or glass. But in case of using silica gel or glass beads there is a limit of eluent which can be used.

Further, recently a new method has been proposed. That is, after a crosslinked polystyrene is chloromethylated for a short time, it is aminated. Then, an anion exchange resin of surface functional type is obtained. But such resin hasn't had a sufficient separation ability yet. Further, when an anion exchange resin is produced in a large amount in this method, the resin reproducibility with same properties will be difficult.

The present inventors formerly invented an anion exchange resin of surface functional type in which is covalently bonded pendently a polyamine having at least one kind of from primary to tertiary amines and quaternary ammonium group on the surface of a crosslinked copolymer, and an anion exchange group does not exist essentially in the inside of the crosslinked copolymer.

In said resin, however, the thickness of a superficial functional group is not so thin that separation ability in ion exchange chromatography is not sufficient.

The present inventors have accomplished the present invention as a result of extensive study in more detail in view of improving such a demerit.

SUMMARY OF THE INVENTION

An anion exchange resin of surface functional type according to the present invention is a resin characterized in that the surface of the lipophilic crosslinked polymer matrix is coated with a hydrophilic polymer layer which is insoluble in water and has an amino group or a quaternary ammonium group.

The resin has a unique structure in which said hydrophilic polymer layer is not chemically bonded to said crosslinked polymer matrix and the superficial layer is made to be insoluble in water by crosslinking in itself.

Such an anion exchange resin of surface functional type is obtained by coating a lipophilic crosslinked polymer matrix which does not react with amine with a linear polymer which does not react with said lipophilic crosslinked polymer matrix, and has a functional group which is capable of reacting with an amine, and aminating subsequently with a polyamine alone or a mixture of a polyamine and a monoamine.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings, wherein:

FIGS. 1 and 2 represent the chromatographic spectra obtained upon elution of a six-component anion mixture from embodiments of the anion exchange resin of the present invention as a function of conductivity.

DETAILED DESCRIPTION OF THE PREFERRED EMBODIMENTS

An anion exchange resin of surface functional type according to the present invention is prepared as follows. A lipophilic crosslinked polymer matrix which does not react with amine is dispersed in an organic solvent in which is dissolved a linear polymer which does not react with said lipophilic crosslinked polymer matrix and has a functional group which is capable of reacting with amine.

After the dispersion mixture is stirred at a predetermined temperature for predetermined hours, the organic solvent is removed by filtration or evaporation to obtain the resin coated with the linear polymer.

The resin thereby obtained is reacted with an amine solution containing polyamine to cause crosslinking and amination at the same time. In this paper amination includes quaternary ammoniumization by tertiary amines.

As the lipophilic crosslinked polymer matrix which does not react with amine in the present invention, one of copolymers of monovinyl compound and polyvinyl compound below mentioned can be used.

Generally, as monovinyl compound, there may be mentioned styrene; a lower alkyl ester of a (meth)acrylic acid such as methyl (meth)acrylate and ethyl (meth)acrylate, acrylonitrile and so on. As polyvinyl compound there may be mentioned a polyvinyl compound known as a crosslinking agent such as divinyl benzene, ethylene glycol di(meth)acrylate and tetramethylol methane tri(meth)acrylate and so on. Among them, a crosslinked polystyrene resin is particularly preferred. These copolymer may be a porous or gell type, but a porous type is particularly preferred in order to increase the amount of functional group to be introduced. The particle size may be arbitrary, but as a packing for ion exchange chromatography, the particle size of from 1 μm to 50 μm is particularly preferred.

As a linear polymer which does not react with said lipophilic crosslinked polymer matrix and has a functional group which is capable of reacting with amine, there may be mentioned a homopolymer or a copolymer of following monomers, a vinyl benzyl halide such as vinyl benzyl chloride, vinyl benzyl bromide, vinyl benzyl iodide and so on; a vinyl halide such as vinyl chloride, vinyl bromide and so on; epihalohydrine such as epichlorohydrine and so on; glydicyl (meth)acrylate. A homopolymer of a monomer (A) having a halogen atom or an epoxy group which is a functional group which is capable of reacting with amine or a copolymer of said monomer (A) and a monovinyl compound (B) such as styrene, (meth)acrylic acid ester, acrylonitrile and so on is used. Among them, a linear polyvinyl benzyl halide such as polyvinyl benzyl chloride, polyvinyl benzyl bromide and so on is particularly preferred. As a linear polymer, a copolymer having molecular weight of from 1000 to 1,000,000 preferably, from 5,000 to 200,000 is used.

When a superficial anion exchange resin according to the present invention is employed in ion exchange chromatography, it is necessary that the density of functional group which is capable of reacting with amine in a linear polymer is preferably high, so the content of monomer (A) which is capable of reacting with amine is preferably not less than 50 mol % in a linear polymer.

As the organic solvent to be used in the present invention for dissolving said linear polymer, there may be used various organic solvents such as, for example, ketones such as acetone, diethylketone and so on; ethers such as diethylether, tetrahydrofuran and so on; aromatic hydrocarbons such as benzene, toluene, xylene and so on; and halogen-containing solvents such as trichloromethane, dichloroethane, chlorobenzene, dichlorobenzene and so on.

As the linear polymer solution, there may be used a polymerization solution of corresponding monomer in said organic solvent, but a solution of the refined linear polymer dissolved in said organic solvent is preferably used.

The coating process of the linear polymer on the lipophilic crosslinked polymer matrix is carried out by dispersing the lipophilic crosslinked polymer matrix in said solution of the linear polymer and stirring for not less than 30 minutes and not more than 10 hours, preferably for not less than 30 minutes and not more than 5 hours.

If ultrasonic dispersion are applied at the beginning of dispersing operation, dispersion and deairation of resin can be done completely. Room temperature is sufficient for the dispersion temperature but heating can be done if necessary. The heating temperature, in that case, should be below the boiling point of said solvent.

The organic solvent is removed by filtration or evaporation.

In the case of removing the organic solvent by filtration it is necessary to dissolve a larger amount of linear polymer than the amount of linear polymer to be coated.

The amount of the coated linear polymer per unit weight of the lipophilic crosslinked polymer matrix is changed depending upon its particle size and porosity and the linear polymer concentration in the organic solvent. Accordingly, specification of the concentration of the linear polymer is difficult.

For example, in order to obtain a resin containing from 20 μmol to 80 μmol of chlorine group per 1 g of the resin, a porous crosslinked polystyrene MCI GEL CHP 3C (MCI GEL is the trade mark of Mitsubishi Chemical Industries Limited) is dispersed in a polyvinyl benzyl chloride solution in which chlorine group of polyvinyl benzyl chloride exist from 5 μmol to 40 μmol per 1 ml of organic solvent such as dichloroethane, toluene and so on. The solution is employed in an amount of from 5 to 10 ml per 1 g of the resin weight. In order to obtain the same amount of coating, the concentration of the linear polymer is to be raised in case that the particle size of the crosslinked polystyrene is larger than 20 μm, and to be lowered in case that the particle size of the crosslinked polystyrene is smaller than 20 μm. In case that the porosity is small, the concentration of the linear polymer is to be raised and in case that the porosity is large, the concentration of the linear polymer is to be lowered.

In the case of removing organic solvent by evaporation, a little larger amount of the linear polymer than the amount of the linear polymer to be coated should be dissolved.

The resin thus prepared which is coated with a linear polymer is reacted with a polyamine alone or a mixture of polyamine and monoamine.

As a polyamine there may be mentioned an alkylene diamine having from $C_2$ to $C_{10}$ carbon atoms, preferably from $C_2$ to $C_6$ carbon atoms such as ethylene diamine, trimethylene diamine, tetramethylene diamine, pentamethylene diamine, hexamethylene diamine and so on; N-lower alkyl substituted derivatives thereof such as N-methyl, N-ethyl derivatives and so on; N,N-di lower alkyl substituted derivatives thereof such as N,N-dimethyl, N,N-diethyl derivatives and so on; N,N,N'-tri lower alkyl substituted derivatives thereof such as N,N,N'-trimethyl derivatives and so on; N,N,N',N'-tetra lower alkyl substituted derivatives thereof such as N,N,N',N'-tetramethyl derivatives and so on; N-lower alkanol substituted derivatives thereof such as N-hydroxyethyl derivatives; N,N-lower dialkanol substituted derivatives thereof such as N,N-dihydroxyethyl derivatives and so on; and polyamines such as diethylene triamine, triethylene tetramine, hexamethylene tetramine, tetraethylene pentamine and so on.

As a monoamine to be employed there may be used a primary amine such as methyl amine, ethyl amine, propyl amine and so on; a secondary amine such as dimethyl amine, diethyl amine and so on; a tertiary amine such as trimethyl amine, triethyl amine and so on; an alkanolamine such as ethanolamine, diethanolamine and so on; an alkyl alkanolamine such as methylethanol amine, methyl diethanolamine, dimethyl ethanolamine and so on.

These amines as a solution of polyamine alone or of a mixture of a polyamine and a monoamine are reacted with a resin coated with said linear polymer.

In the case of using a mixture of a polyamine and a monoamine, not less than 0.1 mol %; preferably not less than 1 mol % of polyamine per total amount of the amine is used.

As the solvent in which are dissolved these amines, there may be used a solvent which does not dissolve the linear polymer coated on the resin. As a typical example, water and alcohols such as methanol, ethanol, propanol and so on may be employed.

If the concentration of the amine solution is too low, amination does not take place. Therefore, amine solution containing not less than $10^{-4}$ mol/l, preferably not less than $10^{-3}$ mol/l of amine is to be employed.

The amination is carried out at a temperature of from 20° C. to not more than the boiling point of the solvent for from one to 10 hours after dispersing said resin coated with a linear polymer in said amine solution.

In case of reacting an amine having lower boiling point at a temperature of not less than the boiling point of said amine an autoclave is employed.

Amination proceeds quantitatively. In case that the amount of the functional group which is capable of reacting with amine in said resin is too many, the reaction can be controlled by lowering the reaction temperature or by shortening the reaction time.

For the use of ion exchange chromatography, not less than 50% of the functional group which is capable of reacting with an amine in said resin is preferably aminated.

In this amination the linear polymer is immobilized by crosslinking with polyamine and at the same time an amino group or a quaternary ammonium group is introduced. After the reaction the product is filtered and washed with 1N HCl aqueous solution and water in order.

The anion exchange resin of surface functional type thereby obtained has good durability. And resins having optional particle size can be produced according to the present procedure. Since each reaction in this method is a complete reaction, difference of the quality when produced in large amount is small.

Further, since ion exchange groups of these resins exist only in the surface ion exchange reaction proceeds rapidly.

Accordingly, this resin is useful for a packing for ion exchange chromatography. Particularly, a strongly basic anion exchange resin having a quaternary ammonium group made from a tertiary amine as a polyamine and/or monoamine shows good chromatogram.

As a packing for ion exchange chromatography, a resin having a particle size of from 1 to 50 μm, preferably from 5 to 30 μm, and the amount of a quaternary ammonium group of from 5 μeq/g to 200 μeq/g, preferably from 10 μeq/g to 100 μeq/g is particularly preferred.

Now, the present invention will be described more concretely with reference to Examples, which are presented merely for the purpose of illustration of the present invention and by no means restrict the present invention.

Measuring method of HCl adsoprtion capacity

Ag (not more than 3 g) of an dry anion exchange resin of surface functional type thereby obtained and dried are put in an conical flask, in which is added 30 ml of 0.1N NaOH, and shaken at room temperature for 1 hour. After filtration, washing with water is conducted until pH of the washing water becomes 7. After water was removed by suction filtration for 10 minutes, the resin is transferred to a conical flask, in which is added 20 ml of 0.01N HCl, and ultrasonic waves are applied for one minute, followed by shaking for two hours at room temperature.

After filtration, the filtrate is collected. The resin is washed with 10 ml of desalted water three times and the washing water was added to the collected filtrate. The filtrate is titrated by 0.01N NaOH with the use of a mixed indicator of methyl red and methylen blue.

The HCl adsorption capacity can be calculated as follows.

HCl adsorption capacity
$(\mu eq/g) = (Mo - M) \times 10 \times f/A$ wherein f is a factor of 0.01N NaOH, M ml is amount of 0.01N NaOH used and Mo ml is the blank value of 20 ml of 0.01N HCl.

EXAMPLE 1

To a solution of 128 mg of polyvinyl benzyl chloride (limiting viscosity: 0.28) dissolved in 40 ml of dichloroethane were added 6 g of MCI GEL CHP3C (MCI GEL is the trade mark of Mitsubishi Chemical Industries Limited) the particle size of which had been adjusted to 20 μm. The mixture was shaken for an hour at room temperature. After filtration the resin obtained was dried for 30 minutes at room temperature to obtain 8 wet-g of the resin coated with polyvinyl benzyl chloride.

In 25 ml of water in which was dissolved 0.5 g of hexamethylene diamine and 1.5 g of dimethylethanolamine were dispersed 1.7 g of the coated resin thereby obtained with the use of a little amount of methanol. Subsequently supersonic dispersion was done for one minute and the mixture was stirred and reacted for 30 minutes at room temperature and for 3 hours at 60° C.

After the reaction amine was neutralized with the addition of 1N HCl and the mixture was filtrated and washed with water.

The HCl adsorption capacity of this porous superficial basic anion exchange resin was measured to be 40 μeq/g.

EXAMPLE 2

To a solution of 256 mg of polyvinyl benzyl chloride (limiting viscosity: 0.28) dissolved in 40 ml of dichloroethane were added 6 g of MCI GEL CHP 3C (MCI GEL is the trade mark of Mitsubishi Chemical Industries Limited) the particle size of which was adjusted to 17 μm. The mixture was subjected to an ultrasonic dispersion for 2 minutes and then shaken for one hour at room temperature. After filtration the resin obtained was dried for 30 minutes at room temperature and for 5 hours under reduced pressure to obtain 6 dry-g of the resin coated with polyvinyl benzyl chloride.

In 25 ml of methanol solution in which was dissolved 0.12 g of hexamethylenediamine and 1.8 g of dimethylethanolamine were dispersed 2.0 g of the coated resin thereby obtained. The dispersion mixture was shaked and reacted for 3 hours at 60° C. under shaking.

After completion of the reaction amine was neutralized with 1N HCl and then the mixture was filtrated and washed with water.

The HCl adsorption capacity of this porous superficial basic anion exchange resin was measured to be 63 μeq/g.

APPLICATION EXAMPLE 1

With the use of the resin prepared in Example 2, ion exchange chromatography of mixed anions comprising sulphate ion, nitrate ion, bromide ion, phosphate ion, chloride ion and fluoride ion was conducted.

The system for the ion exchange chromatography is comprised of an eluent tank, a pump (miltonroy 0396SF manufactured by Ato Co., Ltd., trade mark), a line sample injector, a separation column made of glass (diameter of 3 mm, length of 330 mm), a suppressor column made of glass (diameter of 3 mm, length of 330 mm), conductivity detector (Vydac 6000CD manufactured by Vydac Co., Ltd., trade mark) and a recorder (Hitachi QPD-56).

A separation column was filled with the resin prepared in Example 2 and a suppressor column was filled with Diaion SK #1 (trademark of Mitsubishi Chemical Industries Limited).

As an eluent, a mixed eluent solution of 0.003M of sodium hydrogencarbonate and 0.0027M of sodium carbonate was employed. The flow rate was 1 ml/min.

As a sample of mixed anions, 20 μl of mixed solution containing 50 ppm of sulphate ion, 30 ppm of nitrate ion, 10 ppm of bromide ion, 50 ppm of phosphate ion, 4 ppm of chloride ion and 3 ppm of fluoride ion was injected into a line sample injector with the use of a microsyringe. A chromatogram obtained was shown in FIG. 1. The chromatogram showed good sensitivity and of good separation.

EXAMPLE 3

With the use of the resin coated with polyvinyl benzyl chloride as prepared in Example 2, amination was carried out in 25 ml of methanol solution in which were dissolved 5 ml of 30% trimethyl amine aqueous solution and 0.12 g of hexamethylene diamine.

The HCl adsorption capacity of this porous superficial basic anion exchange resin was 104 μeq/g.

APPLICATION EXAMPLE 2

Ion exchange chromatography of mixed anion was carried out with the use of the same system as was used in Application example 1 except for a separation column made of glass having 3 mm of diameter and 230 mm of length.

The composition and the amount of mixed anions injected were the same as in Application example 1.

As the eluent, mixed solution of 0.003M of sodium hydrogen carbonate and 0.0018M of sodium carbonate was used at a flow rate of 2 ml/min.

The chromatogram thereby obtained is shown in FIG. 2.

EXAMPLE 4–6

In a 40 ml dichloroethane solution of polyvinyl benzyl chloride (limiting viscosity: 0.28) which amount is shown in Table 1 were dispersed 6 g of MCI GEL CHP3C (MCI GEL is the trade mark of Mitsubishi Chemical Industries Limited) in the same manner as shown in Example 2 to obtain 6 dry-g of the coated resin.

In 25 ml of methanol solution containing 1 mmol/ml of N,N,N′,N′-tetramethyl-1,6-diaminohexane were dispersed 2.0 g of the coated resin thereby obtained and the mixture was shaked and reacted for 20 hours at room temperature.

After the reaction, 1N HCl was added to the solution to neutralize amine followed by filtration and washing with water.

The HCl adsorption capacity of these porous superficial strongly basic anion exchange resins were shown in Table 1.

TABLE 1

| | Surface functionalization of porous crosslinked polystyrene | | |
|---|---|---|---|
| | Example 4 | Example 5 | Example 6 |
| Polyvinyl benzyl chloride (mg/g - polymer) | 6.1 | 21.3 | 30.5 |
| HCl adsorption capacity (μ eq/g - polymer) | 15 | 38 | 69 |

EXAMPLES 7 AND 8

In a 40 ml dichloroethane solution of polyvinyl benzyl chloride (limiting viscosity: 0.28) which amount is shown in Table 2 were dispersed 6 g of copolymer particles which particle size is 15 μm and was composed of 6% of divinyl benzene (purity 56%) and 94% of styrene.

The subsequent operation was same as shown in Examples 4 to 6.

The HCl adsorption capacities of superficial strongly basic anion exchange resin (gell type) was shown in Table 2.

TABLE 2

| | Surface functionalization of crosslinked polystyrene (gell type) | |
|---|---|---|
| | Example 7 | Example 8 |
| Polyvinyl benzyl chloride (mg/g - polymer) | 6.1 | 30.5 |
| HCl adsorption capacity (μ eq/g - polymer) | 5 | 18 |

EXAMPLE 9

In a solution of 2.9 g of N,N,N′,N′-tetramethyl diaminoethane dissolved in 25 ml of methanol were dispersed 1.7 g of the polyvinyl benzyl chloride coated resin prepared in Example 1.

After 2 minutes of ultrasonic dispersion, the mixture was shaked and reacted for 10 hours at room temperature.

After the reaction, 1N HCl was added to neutralize amine followed by filtration and washing with water.

The HCl adsorption capacity of this porous superficial strongly basic anion exchange resin was 29 μeq/g.

EXAMPLE 10

The same procedure as shown in Example 9 was done except for 3.25 g of N,N,N′,N′-tetramethyl-1,3-diaminopropane was used instead of N,N,N′,N′-tetramethyl diaminoethane in Example 9.

The HCl adsorption capacity of this porous superficial strongly basic anion exchange resin was 31μ eq/g.

EXAMPLE 11

In a solution of 256 mg of polyvinyl benzyl chloride (limiting viscosity: 0.28) dissolved in 40 ml of acetone were dispersed 6 g of MCI GEL CHP 3C (MCI GEL is a trade mark of Mitsubishi Chemical Industries Limited) which particle size was adjusted to 20 μm.

Subsequently, coating step and amination step were carried out in the same manner as shown in Example 2.

The HCl adsorption capacity of this porous superficial basic anion exchange resin was 54 μeq/g.

EXAMPLE 12

In a solution of 36.6 mg of polyvinyl benzyl chloride (limiting viscosity: 0.28) dissolved in 40 ml of dichloroethane were dispersed 6 g of MCI GEL CHP 3C (MCI is the trade mark of Mitsubishi Chemical Industries Limited) which particle size was adjusted to 20 μm.

The dispersion mixture was shaken for an hour at room temperature and subsequently, dichloroethane was removed by evaporation with the use of rotary evaporator at 50° C.

This coated resin was aminated in the same manner as shown in Example 2.

The HCl adsorption capacity of this porous superficial basic anion exchange resin was 27 μeq/g.

What is claimed is:

1. An anion exchange resin of the surface functional type having a structure in which the surface of a lipophilic cross-linked polymer matrix is coated with a water insoluble hydrophilic polymer layer having amino groups or quaternary ammonium groups, said hydrophilic polymer layer not being chemically bonded to said lipophilic cross-linked polymer matrix and being insoluble in water by virtue of the cross-linking within itself which occurs when said amino and quaternary ammonium groups are introduced into the hydrophilic polymer.

2. The anion exchange resin of claim 1 wherein said lipophilic cross-linked polymer matrix is a copolymer of a polyvinyl compound and at least one monovinyl compound selected from the group consisting of styrene, a lower alkyl ester of (meth)acrylic acid and acrylonitrile.

3. The anion exchange resin of claim 2 wherein said lipophilic cross-linked polymer matrix is a cross-linked polystyrene.

4. The anion exchange resin of claim 1 wherein said hydrophilic polymer layer is cross-linked with a polyamine.

5. The anion exchange resin of claim 4, wherein said hydrophilic polymer layer is made from a linear polymer having a halogen atom and/or an epoxy group.

6. The anion exchange resin of claim 5, wherein said hydrophilic polymer layer is made from a linear polyvinyl benzyl halide.

7. The anion exchange resin of claim 5, wherein the molecular weight of said linear polymer is from 1,000 to 1,000,000.

8. The anion exchange resin of claim 7, wherein said molecular weight ranges from 5,000 to 200,000.

9. The anion exchange resin of claim 2, wherein said lipophilic cross-linked polymer matrix is porous.

10. A process for producing an anion exchange resin of the surface functional type, comprising:
coating a surface of a lipophilic cross-linked polymer matrix which does not react with an amine with a linear polymer which does not react with said lipophilic cross-linked polymer matrix and has a functional group which is capable of reacting with an amine; and
aminating said functional group containing linear polymer with a polyamine alone or a mixture of a polyamine and a monoamine.

11. The process according to claim 10, wherein said lipophilic cross-linked polymer matrix is a copolymer of a polyvinyl compound and at least one monovinyl compound selected from the group consisting of styrene, a lower alkyl ester of methacrylic acid and acrylonitrile.

12. The process of claim 11, wherein said lipophilic cross-linked polymer matrix is a cross-linked polystyrene resin.

13. The process of claim 10, wherein said coating linear polymer is a homopolymer having a halogen atom and/or an epoxy group.

14. The process according to claim 13, wherein the content of a monomer having a halogen atom or an epoxy group in said linear polymer is not less than 50 mol %.

15. The process according to claim 13, wherein said coating linear polymer is a linear polyvinyl benzyl halide.

16. The process according to claim 10, wherein the molecular weight of said linear polymer is from 1,000 to 1,000,000.

17. The process according to claim 10 wherein said molecular weight ranges from 5,000 to 200,000.

18. The process of claim 10, wherein said coating step further comprises dispersing a lipophilic cross-linked polymer matrix in an organic solution in which is dissolved a linear polymer, and stirring the resulting dispersion at a temperature of from room temperature to not more than the boiling point of the solvent for from not less than 30 minutes to not more than 10 hours.

19. The process of claim 10, wherein the amount of said polyamine is not less than 0.1 mol % of the total amount of amine.

20. The process of claim 10, wherein said aminating step further comprises dispersing a lipophilic cross-linked polymer matrix which is covered with a linear polymer in an amine solution, and reacting the dispersion mixture at a temperature of from 20° C. to not more than the boiling point of the solvent for from one to 10 hours.

21. The process of claim 20, wherein the concentration of said amine in the solution is not less than $10^{-4}$ mol/l.

22. The process of claim 21, wherein the concentration of said amine in the solution is not less than $10^{-3}$ mol/l.

* * * * *